UNITED STATES PATENT OFFICE.

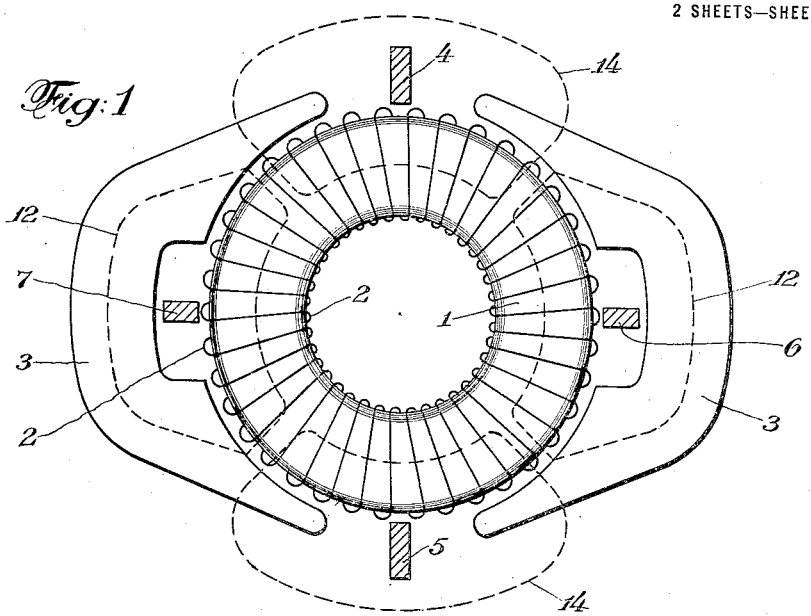
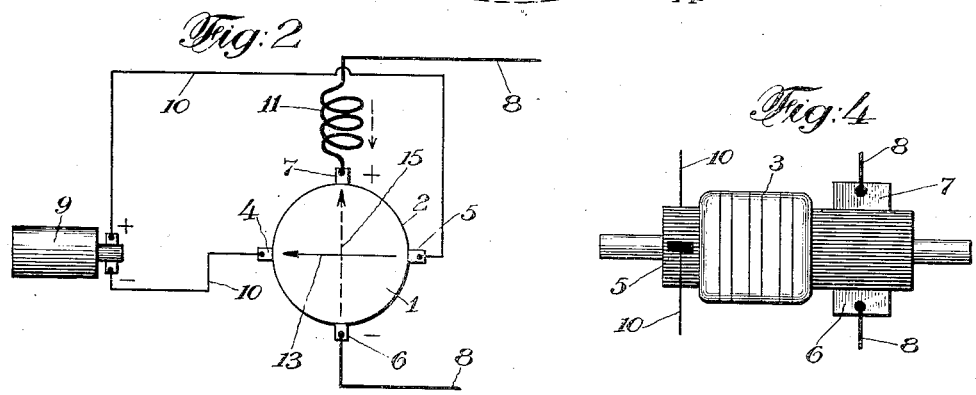
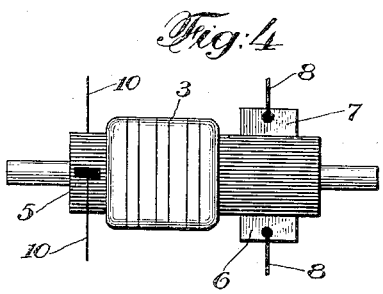
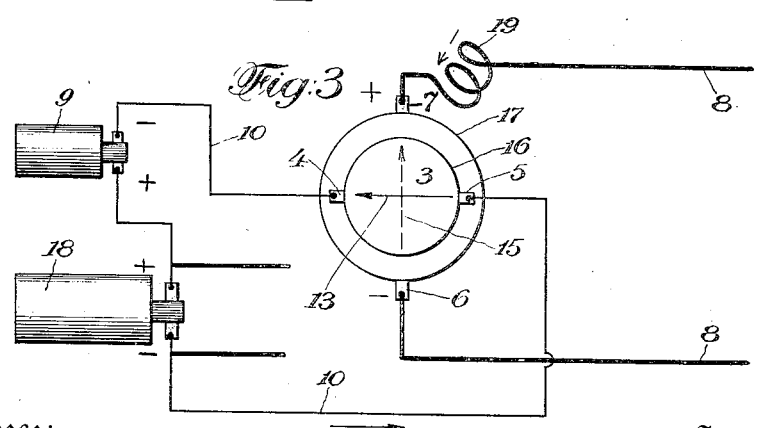

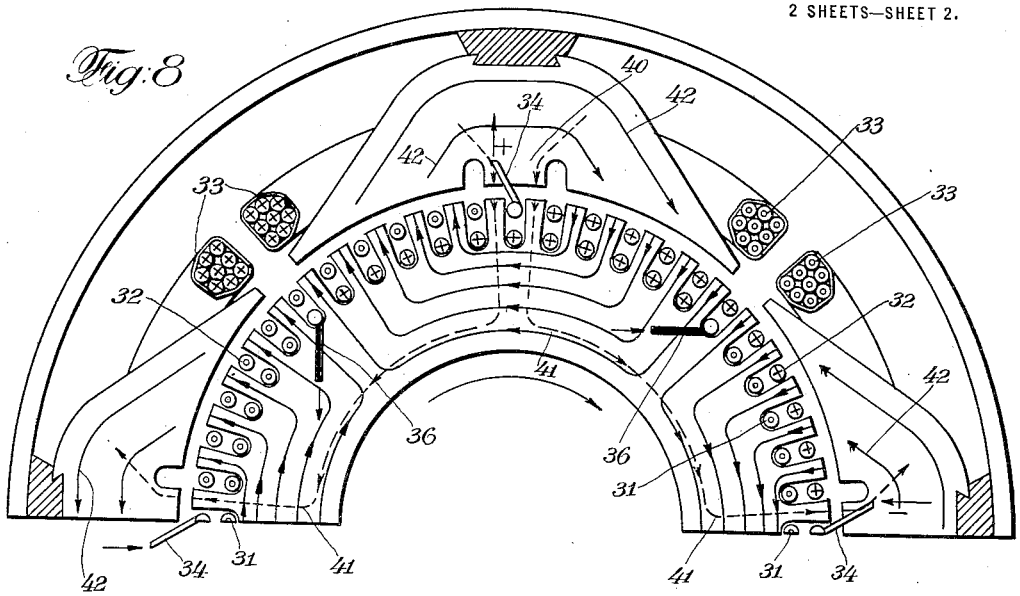
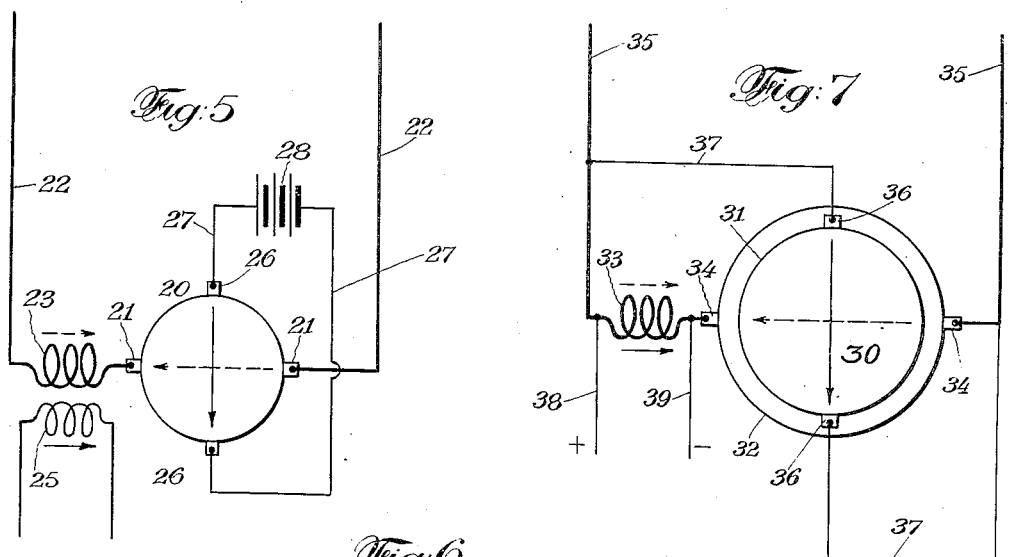
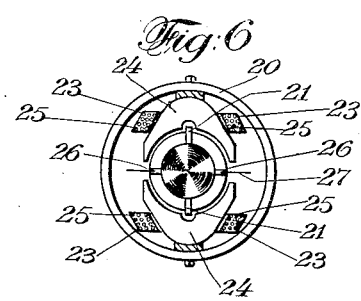

WILLIAM A. TURBAYNE, OF LANCASTER, NEW YORK, ASSIGNOR TO GOULD STORAGE BATTERY COMPANY, A CORPORATION OF NEW YORK.

DYNAMO-MACHINE AND APPARATUS.

1,174,104. Specification of Letters Patent. Patented Mar. 7, 1916.

Application filed January 29, 1910. Serial No. 540,745.

*To all whom it may concern:*

Be it known that I, WILLIAM A. TURBAYNE, a citizen of the United States, and a resident of Lancaster, in the county of Erie, State of New York, have invented certain new and useful Improvements in Dynamo-Machines and Apparatus, of which the following is a specification.

My invention relates to improvements in dynamo machines and apparatus.

One object of my invention is to provide a reversible booster or dynamo which will be properly regulated and yet in which there is a minimum amount of apparatus and in which the energy losses are markedly decreased.

The usual type of electric generator, in which a wound armature rotates within the influence of massive poles upon which are concentrated the magnetizing windings possesses characteristics that are of disadvantage under several circumstances. When used as regulating boosters for storage batteries, etc., machines should be quick in action and regulate closely.

A further object of my invention is to reduce the sluggishness of such machines due to self-inductance and cause them to regulate more closely and thereby obtain much quicker and more effective regulation.

As distinguished from quickness of action, closeness of regulation demands a booster in which the armature voltages will be very closely proportional to variations of exciting current both of rising and falling directions of magnetization of either positive or negative quantity. In other words, the machine should show a hysteresis loop of negligible area when varied through complete cycles of magnetization between positive and negative maxima. If the booster shows a large hysteresis loop the armature voltage due to the residual magnetic flux will sustain the battery charge, or discharge, as the case may be, at a period when the exciting current, has considerably passed beyond zero in a reversed direction and which, consequently, should be followed by similar battery action, so that the magnetomotive force absorbed in annuling the residual flux is not effective for bringing the battery into action for regulation purposes. It is evident, therefore, that the less the magnetic lag as represented by a hysteresis loop of minimum area, the better adapted will the booster be for purposes of maintaining close regulation. An effective booster, therefore, should preferably have a minimum inductance in its exciting circuit and a minimum mass of iron in its magnetic structure, it being further important that all iron carrying the effective flux be efficiently laminated and assembled in such a manner as to prevent any formation of eddy currents inasmuch as these act to oppose the main flux variations by reason of their counter magnetizing effect. I have provided a type of booster that may be so arranged in a system as to be controlled by slight changes such as the changes of current permitted to fall upon the main generator, while all regulating apparatus external to the booster may be eliminated. Moreover, I have so devised the booster that it is extremely rapid in its response to the fluctuations for which it is to regulate. To cut down the lag in operation due to hysteresis, leakage flux, and other causes I have proposed the use of a dynamo machine in which the magnetizing current producing the effective flux is introduced directly to the armature windings through brushes on the commutator spaced ninety electrical degrees from the main or working brushes. Rotation of the armature through the flux thus produced develops an electromotive force therein having a maximum value across the working or main brushes, but having a zero value at the exciting brushes, these being in line with the symmetry axis of the flux. In order to prevent distortion of this flux axis by action of the working current I provide fixed compensating windings, properly disposed around the external iron portions, these being included in the working circuit and having a magnetomotive force equaling in value, but opposing the magnetomotive force due to the working current through the armature. I also find, that by slightly overwinding these compensating turns so that their magnetomotive force will preponderate over that of the armature turns, a component of flux will be set up which will develop an electromotive force assisting that of the exciting source. I also find that by carrying this effect still further it is possible to entirely eliminate the auxiliary exciters or regulating machines and that the regulating functions may be produced within the booster itself without adversely affecting its action and without necessitating the use of additional material in its construction. Thus the lag and sluggishness due to the exciting or other regulating machines is entirely done away with, and the booster and system are made much more sensitive and quickly responsive. Nicety and closeness of regulation is obtained through the agency of the exciting current which is set up in the armature due to its rotation through the field produced by the compensating windings. These features taking the place of the auxiliary machine heretofore used.

Further objects, advantages and improvements will more clearly appear from the detail description given below taken in connection with the accompanying drawings which form a part of this specification.

In the drawings, Figure 1 represents diagrammatically a dynamo embodying certain features of my invention. Fig. 2 is a diagrammatic representation of connections of a dynamo embodying certain features of my invention. Fig. 3 is a similar view showing a slightly modified form of connections. Fig. 4 is a view of the armature at the right in Fig. 3. Fig. 5 is a view similar to Fig. 2, but showing a modified arrangement of connections. Fig. 6 is an end view of the dynamo of Fig. 5. Fig. 7 is a view similar to Fig. 5, but showing a still further modified arrangement, and Fig. 8 is a partial diagrammatic view of the dynamo of Fig. 7.

Referring to Figs. 1 and 2, 1 represents the armature of my improved booster or dynamo provided with the usual distributed winding 2 and with pole pieces or field magnets. 4 and 5 represent brushes adapted to make connection with the various coils of the winding 2 as the armature revolves, and are placed approximately at the points of zero difference of potential of the armature. 6 and 7 represent a second set of brushes placed at points ninety electrical degrees from the brushes 4 and 5 and connected to the main circuits, 8. An exciter 9 is arranged to apply an external electromotive force to the brushes 4 and 5 over the circuit 10, 10, and a field coil 11 is connected in series with the main brushes 6 and 7 and designed and arranged to produce a magnetomotive force in opposition to that produced by the main armature current to compensate for armature reaction. If now the exciter 9 causes a current to pass through the armature coils 2 between the brushes 4 and 5 a magnetic flux will be set up, the position of which is represented by the dotted lines 12 in Fig. 1, and the full line 13 in Fig. 2 and the field magnets 3 will be energized. The armature coils rotating through this field have an electromotive force set up therein and a maximum difference of potential is created between the brushes 6 and 7 which will cause a current to flow in the circuit 8, 8, if it is properly connected up. This current will tend to set up a magnetic flux, but in the position shown by the dotted lines 14 of Fig. 1 and the line 15 of Fig. 2. The reluctance offered this flux, however, is very great, the path being mostly of air and consequently the flux strength is very small. This relatively great reluctance in the path of the flux produced by the armature current is obtained by the splitting of the pole pieces and providing a plurality of magnetically separated field structures at each polar region, thus forming an air gap in each polar region which the flux must traverse. The parts at each polar region are separated at quite a distance in order to further increase this reluctance. If the pole pieces were not thus split it is evident that the flux at the lines 14, 14, would have a path of small reluctance and would produce a serious and disadvantageous reactive effect upon the main flux. If after splitting the pole pieces there should still be any appreciable flux distortion produced by the armature current this may be compensated for and offset by the compensating winding 11 which tends to produce a flux to oppose the distortion produced by the armature current. This coil is not an exciting coil but simply compensates for the armature reaction of the dynamo. The field magnets 3 are U-shaped and thoroughly laminated, and serve to close the magnetic circuits, and concentrate the flux at the desired positions. These features prevent serious distortion of the field and allow the use of a minimum amount of iron, which being well laminated prevents losses due to eddy currents. A machine of this construction has a greatly reduced inductance and variations in the exciting current affect the voltage thereof almost instantaneously.

Referring to Fig. 3, the arrangement there shown is similar to that of Fig. 2, the principal difference being that the armature 2 is provided with two sets of windings 16 and 17, the windings 16 being connected with the brushes 4 and 5 and the windings 17 being connected to the brushes 6 and 7, while the exciter 9 is arranged as a counter machine in series with the generator 18. In this modification I have indicated the coil for compensating for armature reaction at 19, at one side of the line between the brushes or between the poles so that when there is any tendency of distortion due to the main armature current in the circuit 8, 8, the coil 19 increases sufficiently in strength to pull the flux back substantially to its original position. The armature 3 of Fig. 3 is more clearly shown in Fig. 4, the operation, however, is substantially the same as that given with respect to Figs. 1 and 2, the main exciting flux being produced by the windings 16 whenever there is a difference in voltage between the machines 9 and 18, this flux producing the main electromotive force in the windings 17.

Referring to Figs. 5 and 6, the dynamo 20 is provided with main or working brushes 21, 21, which take off or conduct away the main armature current to the circuit 22. In series with these brushes is a coil 23 which has an axis symmetrical with that of the working armature conductors and tends to set up a flux which opposes the flux which tends to be set up by the main armature current. The windings 23 are placed upon the field structure or magnets 24 which are of the type shown in Fig. 1, and being in series with the working armature conductors their magnetomotive force is proportional to that set up by the working armature conductors and thus effectively and efficiently compensates for armature reaction. 25 represents a second field coil wound parallel with the windings 23 and supplied from any suitable and desired source. Placed at substantially ninety electrical degrees from the brushes 21 are brushes 26 which are connected to a circuit 27 having in series therein a battery or other source 28. Both the working armature conductors and the windings 23 set up magnetomotive forces which tend to produce electromotive forces at the brushes 26, 26, but in opposite directions so that they oppose each other and substantially no difference of potential results at the brushes 26, 26 due to these windings. The windings 25, however, produce a further magnetomotive force which produces a potential difference at the brushes 26, 26, and a current in the circuit 27, but they produce no electromotive force at the brushes 21, 21. This potential difference, if unopposed, will therefore produce an exciting current in the armature conductors which will set up a flux to produce an electromotive force at the main brushes 21, 21. Under certain circumstances, however, it is desirable to oppose the electromotive force set up at the brushes 26, 26, by the electromotive force of the battery 28, or some other suitable source. Under these circumstances exciting current will only flow in the armature conductors when one or the other of these electromotive forces increases or decreases so as to allow a current to flow in the circuit 27. When, however, an exciting current flows in the circuit 27 a flux is immediately set up which produces an electromotive force at the brushes 21 causing the dynamo to feed energy to the circuit 22

Referring to Figs. 7 and 8 the dynamo or booster 30 is somewhat different from the booster 20 in that the former is provided with two armature windings 31 and 32 similar to those shown in Fig. 3, and the two coils 23 and 25 of Fig. 5 are consolidated into a single set of windings 33. The main or working brushes 34 connect the main or working armature conductors 32 with the circuit 35 with the windings 33 in series therewith. The brushes 36 connect the exciting windings 31, across the circuit 35 by means of conductors 37, so that the external electromotive force for the exciting windings is supplied by the dynamo itself. By applying the proper electromotive force to the conductors 38 and 39 the coil 33 will perform the functions of both of the coils 23 and 25 as described in connection with Fig. 5. The operation of the dynamo as a whole is also similar to that described in connection with Fig. 5.

Fig. 8 shows the relationship of currents in the windings and the various components of flux when the coil 25 is of sufficient strength to overcome the opposing electromotive force externally applied to the brushes 36. A four pole machine is, however, shown in which the field structures are provided with commutating lugs 40. The exciting windings are represented by the inner row of conductors and the main or working windings by the outer row of conductors. Although the exciting windings are shown as of the same number and size as the working windings, this is merely for illustrative purposes. In practice the exciting windings are formed into a much larger number of turns of smaller wire than the working windings, in order to obtain the proper number of ampere turns. The field windings 33 set up a component of flux represented by the dotted lines 41 which produces an electromotive force at the brushes 36, 36, overcoming the substantially constant opposing source. This causes an exciting current to flow between the brushes 36, 36, causing a component of flux to be set up represented by the full lines 42 which in turn produces the proper potential difference at the main brushes 34. The positive (+) and negative (0) signs indicate the directions of the exciting and working currents under these conditions. It will also be clear from a consideration of Fig. 8, that the field structure is arranged so that at various poles the structure is split so that two separate paths are provided for the main flux, which paths are magnetically separated. This effectually cuts down the deleterious effect due to the cross flux as described in connection with Fig. 1.

From the above it will clearly appear that I have provided a dynamo which is extremely simple and efficient and which is economical in operation and construction. Furthermore, when used as a booster in storage battery systems or when used as a regulating machine under other circumstances it is extremely sensitive since the sluggishness due to the large masses of iron to be magnetized, has been materially cut down. By providing the exciting windings directly in the armature the use of many auxiliary machines and much apparatus is avoided, and the dynamo gives a closeness of regulation not obtained in other forms of machines.

Although I have described my improvements in great detail nevertheless I do not desire to be limited thereto except as clearly specified hereinafter in the appended claims, since many changes and modifications may be made without departing from the spirit and scope of my invention. But—

Having fully and clearly described my improvements what I claim and desire to secure by Letters Patent, is:

1. A reversible booster provided with an armature and its windings, a main set of brushes for the main electromotive force produced therein, an auxiliary set of brushes on the armature, and an external source of electromotive force applied thereto, to produce a magnetizing current in the armature so that the main field of the booster will be produced in the armature, and windings external to the armature for compensating for armature reaction due to the main armature current of the booster.

2. A reversible booster provided with an armature and its windings, a main set of brushes for the main electromotive force produced therein, an auxiliary set of brushes on the armature, and an external source of electromotive force applied thereto, to produce a magnetizing current in the armature so that the main field of the booster will be produced in the armature, and windings external to said armature arranged to produce a field to set up an opposing electromotive force at the auxiliary brushes.

3. The combination of a reversible booster provided with an armature with two sets of brushes substantially ninety electrical degrees apart, field windings for compensating for armature reaction and for producing an electromotive force at one of said sets of brushes, and means for applying a substantially constant electromotive force at said set of brushes in opposition to that set up by the field coil, the resultant electromotive force acting to set up a main exciting current in the armature.

4. In a reversible booster, the combination of an armature and a commutator therefor, field magnets having the iron at the poles split to form a plurality of independent paths for the magnetic flux, and brushes for admitting a current to the armature from an external source for exciting a field and brushes for taking off the current generated in the armature.

5. In a reversible booster, the combination of an armature, means for admitting current thereto to produce a magnetic field therein, means for taking off the armature current produced by said field and a plurality of field structures magnetically separated at the poles so that a gap is present between them in the path of the flux produced by said armature current.

6. In a reversible booster, the combination of an armature, a commutator, brushes 180 electrical degrees apart for admitting current to said armature to set up a magnetic flux, brushes ninety electrical degrees from said first mentioned brushes and adapted to take off the armature current generated therein due to its rotation through said flux and pole pieces magnetically separated at the poles for affording said flux, a path of small reluctance and arranged to afford the flux produced by the armature current, a path of relatively great reluctance.

In testimony whereof, I have signed my name to this specification, in the presence of two subscribing witnesses.

WILLIAM A. TURBAYNE.

Witnesses:
PIERCE W. ENGLISH,
W. H. PATTENDEN.